(12) United States Patent
Abe

(10) Patent No.: US 6,520,699 B2
(45) Date of Patent: Feb. 18, 2003

(54) KEYBOARD

(76) Inventor: Toshiyasu Abe, 4815 Somerset Dr. SE., Bellevue, WA (US) 98006-3432

(*) Notice: Subject to any disclaimer, the term of this patent is extended or adjusted under 35 U.S.C. 154(b) by 0 days.

(21) Appl. No.: 09/785,813

(22) Filed: Feb. 16, 2001

(65) Prior Publication Data

US 2002/0114654 A1 Aug. 22, 2002

(51) Int. Cl.[7] ............... B41J 5/08; G06F 3/02
(52) U.S. Cl. .......... 400/485; 341/22; 379/369; 379/370; 200/251; 200/345
(58) Field of Search ............... 400/485, 486, 400/476, 488, 491.3, 489; 341/20, 22; 379/369, 370; 200/251, 341, 345

(56) References Cited

U.S. PATENT DOCUMENTS

| | | | |
|---|---|---|---|
| 4,315,114 A | 2/1982 | Monti, Jr. | 200/5 A |
| 4,791,408 A | 12/1988 | Heusinkveld | 340/365 |
| 4,849,732 A * | 7/1989 | Dolene | 341/20 |
| 4,891,777 A | 1/1990 | Lapeyre | 364/706 |
| 5,017,030 A * | 5/1991 | Crews | 400/485 |
| 5,087,910 A | 2/1992 | Guyot-Sionnest | 340/711 |
| 5,156,475 A | 10/1992 | Zilberman | 400/472 |
| 5,269,004 A * | 12/1993 | Comerford et al. | 341/22 |
| 5,288,158 A | 2/1994 | Matias | 400/472 |
| 5,383,735 A * | 1/1995 | Smiley | 400/485 |
| 5,388,061 A | 2/1995 | Hankes | 364/708.1 |
| 5,473,325 A * | 12/1995 | McAlindon | 341/20 |
| 5,515,044 A * | 5/1996 | Glatt | 341/22 |
| 5,528,235 A * | 6/1996 | Lin | 341/22 |
| 5,542,770 A * | 8/1996 | Lin | 400/485 |
| 5,552,782 A * | 9/1996 | Horn | 341/22 |
| 5,568,987 A * | 10/1996 | Franz | 400/485 |
| 5,612,690 A * | 3/1997 | Levy | 341/22 |
| 5,828,363 A | 10/1998 | Yaniger et al. | 345/156 |
| 5,861,823 A | 1/1999 | Strauch et al. | 341/22 |
| 5,973,621 A * | 10/1999 | Levy | 341/22 |
| 6,002,351 A | 12/1999 | Takeda et al. | 341/20 |

* cited by examiner

Primary Examiner—Eugene H. Eickholt
(74) Attorney, Agent, or Firm—Black Lowe & Graham PLLC

(57) ABSTRACT

A user interface device for inputting and outputting information. The user interface device includes a plurality of keys slidably retained within a housing, each key being associated with a plurality of alphanumeric characters or functions. The keys are joined together to slide substantially in unison. The user interface device also includes a pressure sensor configured to detect pressure applied to one or more of the plurality of keys, a direction sensor configured to detect direction of motion of the plurality of keys, a selection component for selecting at least one of an alphanumeric character or function based on the sensed pressure and sensed direction of motion, and an output device for presenting the selected at least one alphanumeric character or function based on the sensed pressure and sensed direction of motion. The selected alphanumeric character or function is associated with the key where the pressure was sensed and with an associated direction closest to the sensed direction of motion. Each alphanumeric character and function associated with each key is further associated with a direction of motion of the plurality of keys.

64 Claims, 15 Drawing Sheets

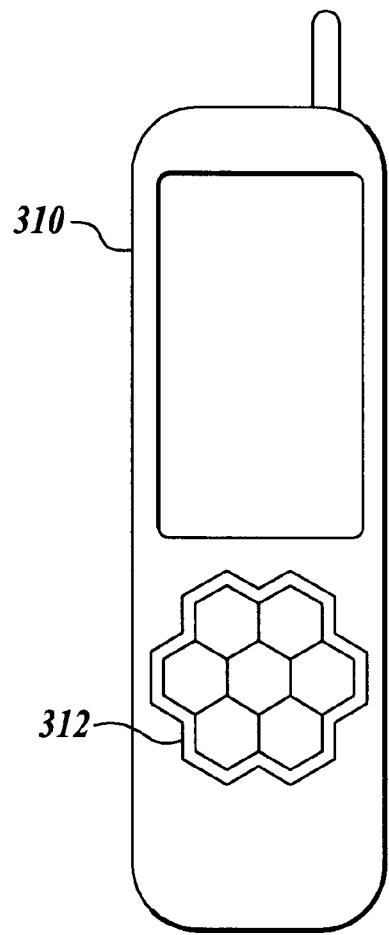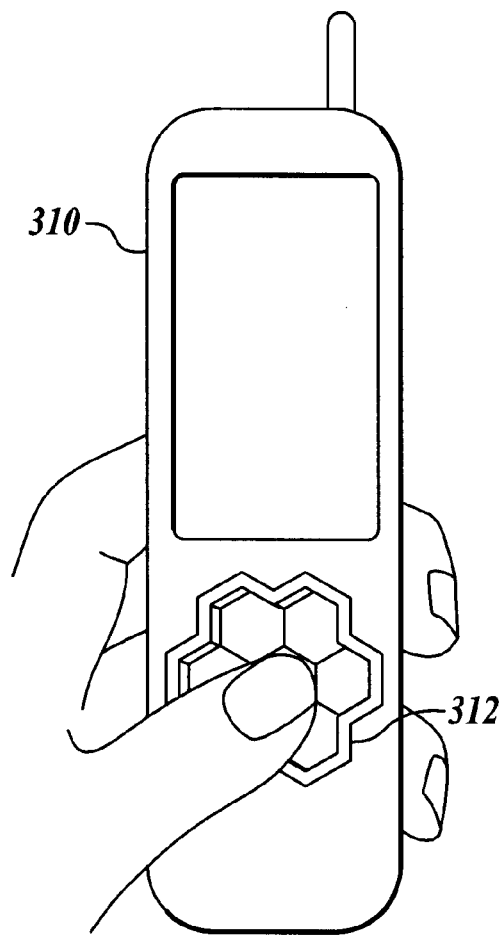
*Fig. 12A.*  *Fig. 12B.*

KEYBOARD

FIELD OF THE INVENTION

This invention relates to keyboards and more particularly the invention relates to keyboards for one or two hand implementation.

BACKGROUND OF THE INVENTION

Many keyboards have been developed to interface with computer systems of various sizes. Devices smaller than a standard desktop or workstation computer are being developed with alphanumeric entry requirements. These smaller devices require an alternative design from traditional keyboards in order to fit on the smaller devices. For example, a cell phone has a number keypad (0–9) with multiple letters assigned to each number key. Depressing a single key one, two, or three times will be interpreted as the entry of a distinct character. Those same keys may perform other operational functions when a different mode of operation is activated. These implementations are ineffective for quickly entering large text messages or quickly selecting device functions.

Other techniques are known in the prior art for producing more functions per key in a keyboard assembly in an attempt to interface with more of the computer functions by a keyboard of modest size. For example, in some keyboards simultaneously actuated keys produce functions or alphanumeric selections not assigned to any one of the actuated keys, but assigned to the combined selection of keys.

However, these keyboards have extremely limited functionality and therefore do not allow the entry of comprehensive data and instructions in a computer. These keyboards also do not allow quick and accurate entry. Accordingly, present input devices are essentially one of two types: full-size keyboards with complete functionality and a large number of keys or small keypads with awkward input schemes and limited functionality. Furthermore, there have not been significant developments in the art that relate to the interface of a one hand operated keyboard and a computer in such a way that touch-typing can proceed. There have been no known such keyboard systems developed with the particular objects of one-handed computer entry with rapidity and elimination of the source of errors. No particular attention has been given to operator finger fatigue or avoidance of unnatural finger positions and reach.

It is therefore an objective of this invention to resolve some of these problems and provide improved keyboard systems.

SUMMARY OF THE INVENTION

The present invention provides a user interface device. The user interface device includes a plurality of keys slidably retained within a housing, each key being associated with a plurality of characters or functions. The user interface device also includes a pressure sensor configured to detect pressure applied to one or more of the plurality of keys, a direction sensor configured to detect direction of motion of the plurality of keys, a selection component for selecting at least one of a character or function based on the sensed pressure and sensed direction of motion, and an output device for presenting the selected at least one character or function based on the sensed pressure and sensed direction of motion. The selected character or function is associated with the key where the pressure was sensed and with an associated direction closest to the sensed direction of motion. Each character and function associated with each key is further associated with a direction of motion of the plurality of keys.

In accordance with another aspect of the invention, the keys are joined together to slide substantially in unison.

In accordance with further aspects of the invention, the selection component determines whether a sensed direction of motion in a series of sensor detections is detected before a sensed pressure, and selects from a first set of a plurality of characters or functions, if a sensed direction of motion in a series of sensor detections is sensed before a sensed pressure. If a sensed pressure in a series of sensor detections is sensed before a sensed direction of motion, the selection component selects from a second set of a plurality of characters or functions.

In accordance with other aspects of the invention, the selection component selects from a first set of a plurality of characters or functions regardless of whether a sensed direction of motion or a sensed pressure is first in a series of sensor detections provided that if a sensed pressure is first, the following sensed direction of motion comes within a threshold period of time from the sensed pressure. If a sensed direction of motion that follows a sensed pressure in a series of sensor detections does not occur within a threshold period of time from the sensed pressure, the selection component selects from a second set of a plurality of characters or functions.

In accordance with still further aspects of the invention, the user interface device includes a thumb control pad moveable within the housing. The direction sensor is further configured to detect direction of motion of the thumb control pad. Thumb control pad movement moves the plurality of keys in the same lateral direction of motion that the thumb control pad is being moved.

In accordance with yet other aspects of the invention, the plurality of keys are circular, hexagon or shaped in another geometric form.

In accordance with still another aspect of the invention, the user interface device includes a second set of keys arranged similar to the first set of plurality of keys.

In accordance with still further aspects of the invention, the characters are letters of the English alphabet and the letters associated with the first and second set of a plurality of keys are arranged in a substantially QWERTY, alphabetic, Dvorak, or other relationships. One or more thumb control pads moveable within the housing, are associated with one of the sets of a plurality of keys. The direction sensor is further configured to detect direction of motion of the thumb control pads. Movement of each thumb control pad moves the corresponding set of plurality of keys in the same lateral direction of motion that the thumb control pad is being moved.

In accordance with yet another aspect of the invention, the pressure sensor includes a key-identifying component for identifying the key where the greatest pressure was sensed.

BRIEF DESCRIPTION OF THE DRAWINGS

The preferred embodiment of the present invention is described in detail below with reference to the following drawings:

FIGS. 11–15 illustrate the present implemented in various devices; and

DETAILED DESCRIPTION OF THE PREFERRED EMBODIMENT

Figure 1:
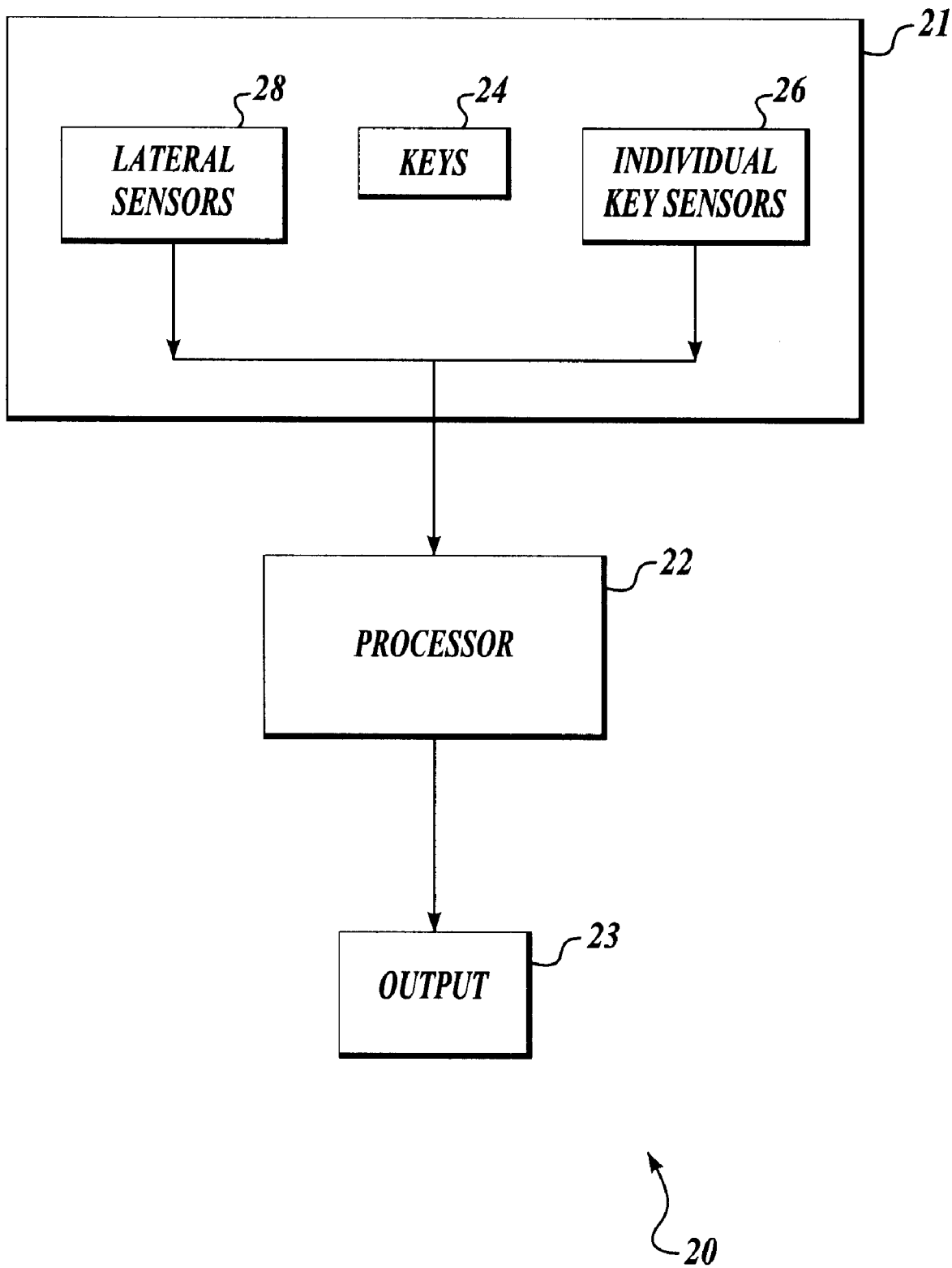
FIG. 1 is a block diagram of the components of the present invention.

FIG. 1 illustrates components of a keyboard system 20 formed in accordance with the present invention. The keyboard system 20 includes a keyboard 21 connected to a processor 22. The processor 22 is connected to an output 23. The output 23 is preferably a display device. The keyboard 21 includes a plurality of keys 24, individual key sensors 26 and a set of lateral sensors 28. When a user depresses a key, the individual key sensors 26 generate a key select signal that indicates which key has been selected. When the keys 24 are moved laterally, the lateral sensors 28 generate a lateral signal that indicates the direction of motion. The generated signals are sent to the processor 22 for analysis. The processor 22 generates an output signal for directing operation of the output 23 based upon the analysis.

Figure 2A:
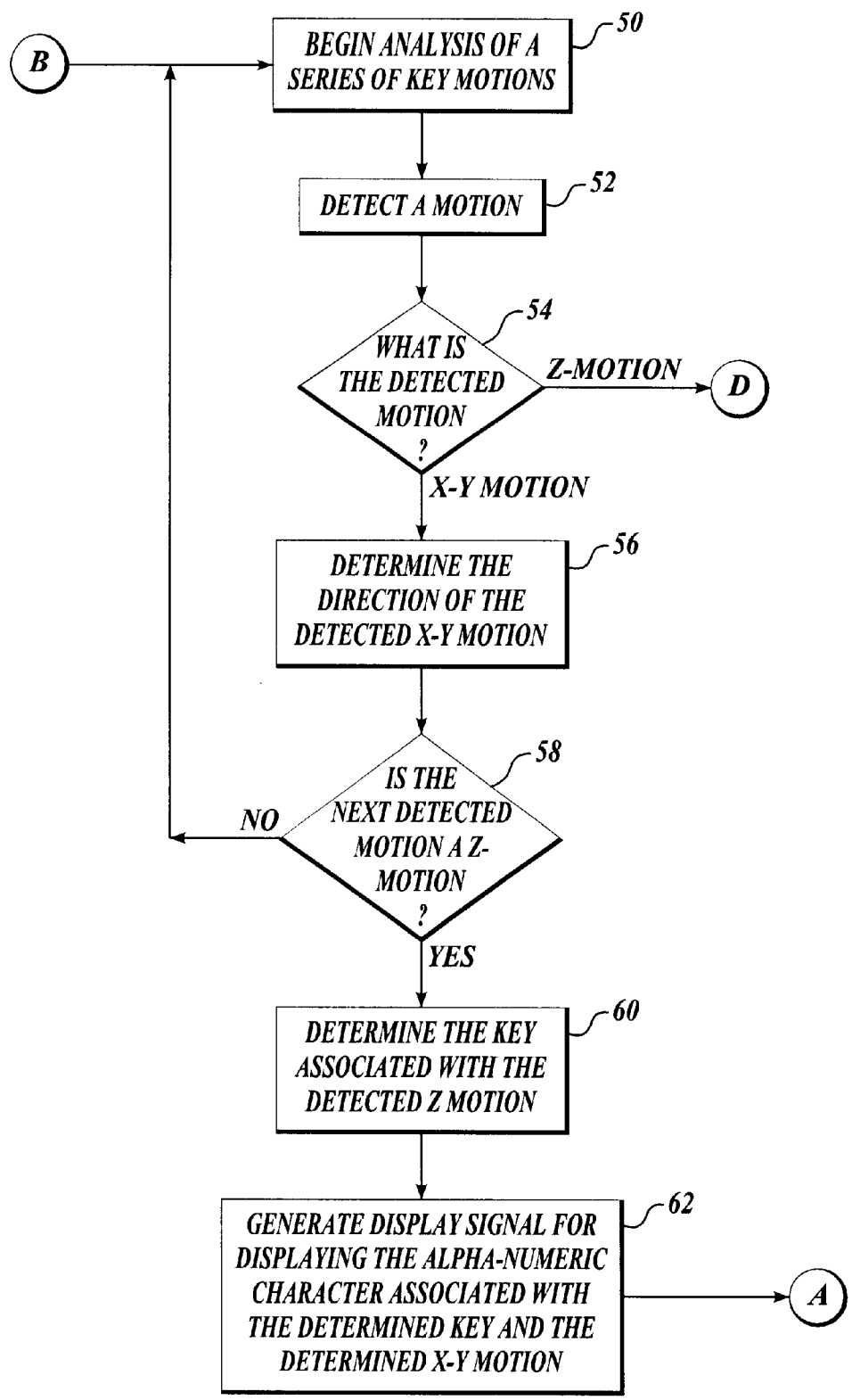
FIGS. 2A–C are flow diagrams performed by the components of FIG. 1.
Figure 2B:
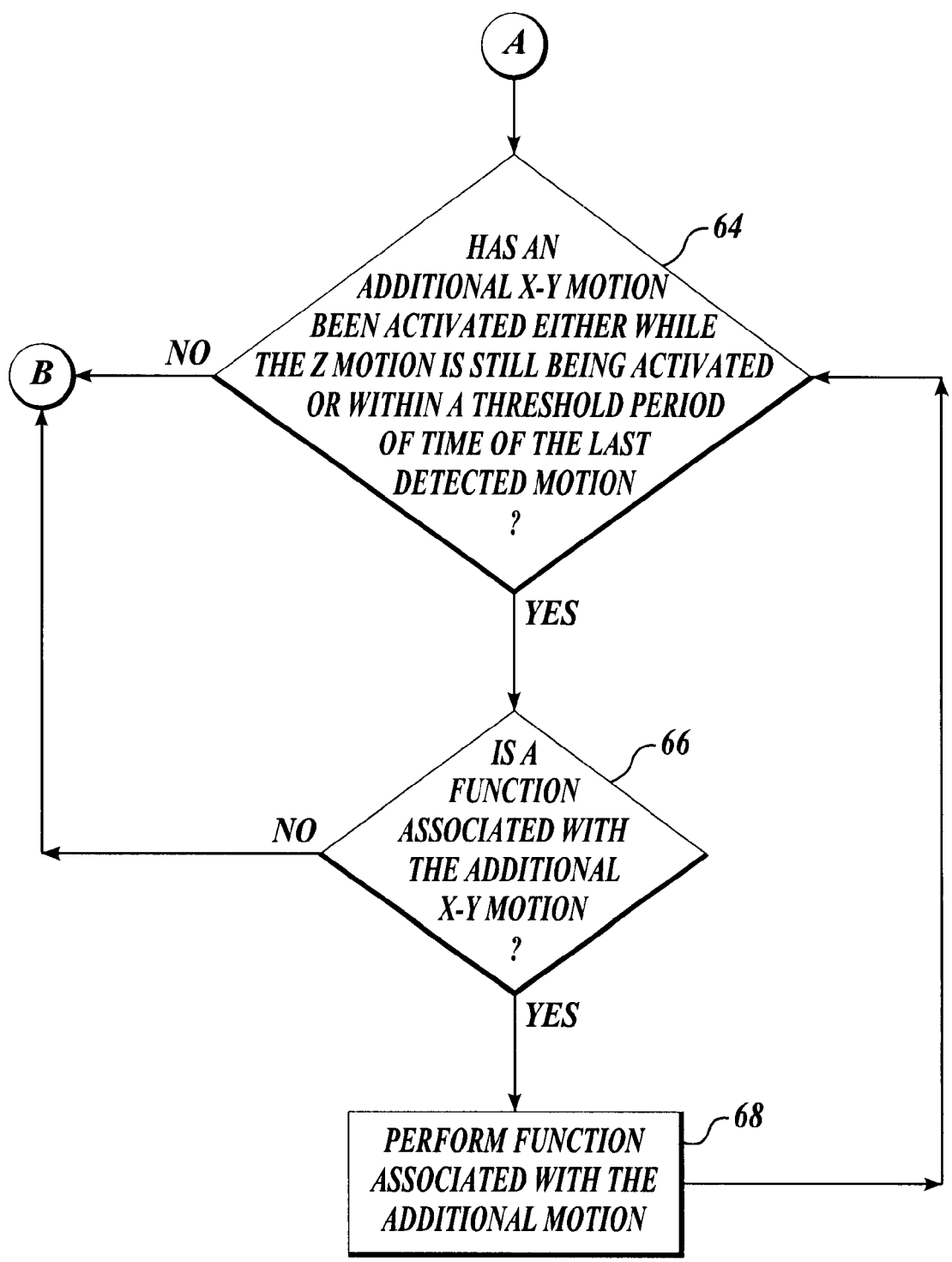
Figure 2C:
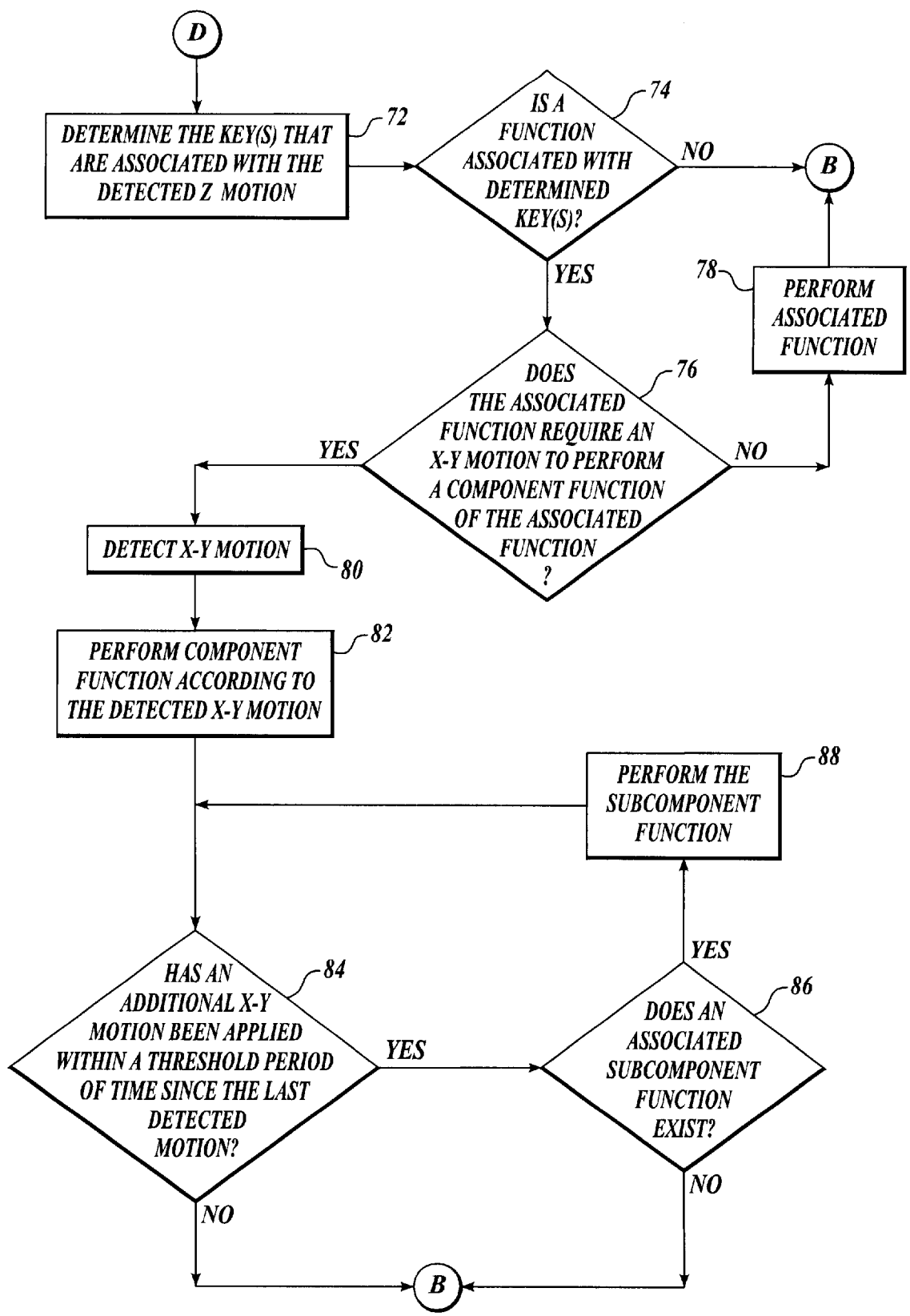

FIGS. 2A–2C illustrate a process performed by the keyboard system shown in FIG. 1. First, at block 50, detection of one or more of key motions begins. At block 52, a first key motion in a series of key motions is detected. Next, at decision block 54, the process determines characteristics of the motion based on the signals generated and sent from the sensors 26, 28. The characteristics of motions that are detected are either an X-Y motion (a lateral motion or a motion approximately parallel to the keyboard plane), or a Z motion (a key depression motion or a motion in a direction generally perpendicular to the keyboard plane). As will be discussed further below, the "motion" detected need not literally comprise key movement, but could alternatively amount to the detection of forces that do not actually move the keys. In such an embodiment, the method evaluates the force imparted on the keys to ascertain force vectors in lateral and vertical planes. Though the following discussion describes motion, all motions could alternatively be detected forces. If the first detected motion (or force) in a series of motions is an X-Y motion, the processor determines the direction of the detected X-Y motion according to the received lateral sensor signal, see block 56. Next, at decision block 58, the process determines if the next detected motion is a Z motion. If the next detected motion is not a Z motion but is another X-Y motion, the process concludes that an error has occurred and returns to block 50 for analyzing a new series of key motions. If, at decision block 58, the detected motion is a Z motion, the process determines the location of the motion and therefore which key is associated with the detected Z motion, see block 60. Next, at block 62, the process generates a display signal for displaying the character or symbol that is associated with the determined key and the determined X-Y motion direction. Next, at decision block 64, the process determines if an additional X-Y motion has been applied while the Z motion is still activated or within a threshold period of time since the Z motion. If no additional X-Y motions have been detected, the process returns to block 50 for processing of a next series of key motions. If an additional X-Y motion has been applied, the process determines if a function is associated with the additional X-Y motion, see decision block 66. If a function is associated with the additional X-Y motion, the process performs the function or action associated with the additional motion, see block 68, and the process returns to decision block 64 for determining if any further X-Y motions have occurred or are occurring. If no function is associated with additional X-Y motion, the process returns to block 50.

In some embodiments, individual keys serve as function keys in addition to representing characters. While characters are typically selected by a motion (or force) in the X-Y and Z planes, functions can be selected by a downward motion alone. Thus, if the defected motion is a downward one, the invention determines, whether a function has been selected. Returning to decision block 54 in FIG. 2A, if the initial detected motion is a Z motion (or force), the process continues to D at the top of FIG. 2C. If the detected motion is a Z motion, the process determines the key(s) associated with the detected Z motion, see block 72. Then, at decision block 74, the process determines whether there is a function associated with the determined key(s). In this sense, a "function" may include, for example, if there is no function associated with the determined key(s), the process returns to block 50 for processing of a next series of key motions. However, if a function is associated with the determined key(s), the process determines if the associated function requires the X-Y motion to perform a component of the associated function, see decision block 76. If no X-Y motion is determined to be required, the process performs the associated function, see block 78. After block 78, the process returns to block 50. If the associated function requires an X-Y motion to perform a component thereof, the process determines whether an X-Y motion has been detected, see block 80. After the X-Y motion has been detected, the process performs the component function associated with the detected X-Y motion, see block 82. Next, at decision block 84, the process determines if an additional X-Y motion has been applied within a threshold period of time since the last detected X-Y motion. If the determination of decision block 84 has not been met, the process returns to block 50. If an additional X-Y motion has been applied within the threshold period of time since the last detected X-Y motion, the processor determines if the component function has any associated subcomponent functions, see decision block 86. If no associated subcomponent functions are associated with the additional X-Y motion, the process returns to block 50. If a subcomponent function is associated with the additional X-Y motion, the process performs the associated subcomponent function, see block 88, then the process returns to decision block 84.

The above description assumes that no X-Y component will be detected when a user selects a function that only requires a downward keystroke, of course, slight lateral forces will almost always be detected even if the user tries to press downward only. Consequently, a threshold amount of lateral movement (or force) is required to be detected before the method determines that a lateral movement was intended.

Figure 3:
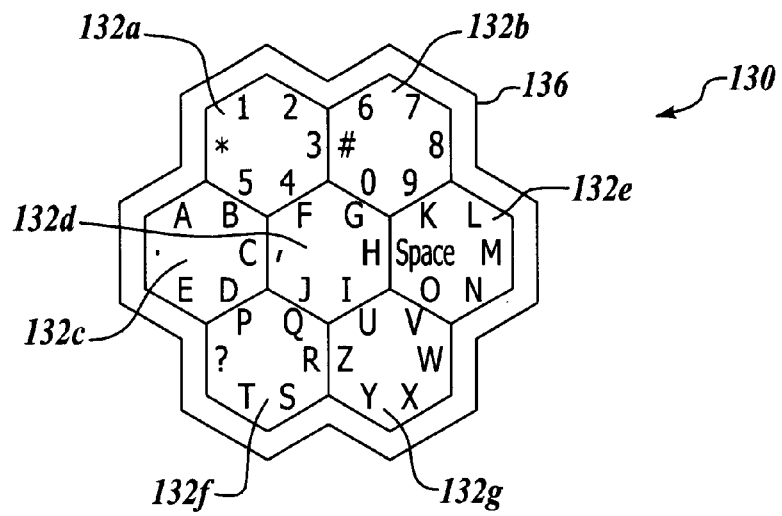
FIG. 3 is a top view of a single-handed embodiment of the present invention.

FIG. 3 illustrates an example keypad for performing the process described for FIGS. 2A–C above. FIG. 3 illustrates a single-handed embodiment of the present invention. Although the keypad of FIG. 3 is operable by a single-hand, it is possible to use both hands to operate it. FIG. 3 illustrates a keypad 130 with a plurality of hexagonal shaped keys 132a–g. The keys 132a–c and 132e–g are positioned around and adjacent to a center key 132d. The keys 132a–g reside in a keypad well 136. The well 136 is wider than the diameter of the group of keys 132a–g. The well 136 allows movement of the keys 132a–g laterally within the well 136. Displayed next to each of the sides on each key is a number, a letter, a symbol or a function name. For example, on the left vertical edge of key 132a is an asterisk symbol, and on the right vertical edge is the number 3. Each item displayed on the keys is selected or activated by a user in a first mode of keyboard operation. In a second mode of keyboard operation, a group of items (symbols, numbers, characters, or functions) not shown on the keys are selectable by the user. In still another embodiment, some or all of the entire group of items (symbols, numbers, characters, or functions) selectable in a second mode of keyboard operation are displayed in the keys in a different font or color than the group of items (symbols, numbers, characters, or functions) associated with the first mode of keyboard operation. At decision block 54 of FIG. 2A the mode selection occurs. If the first motion is an X-Y motion, the mode is the first mode and if the first motion is a Z motion, the mode is the second mode.

Virtually any function is assignable to the keys of the present invention in the first or second mode of operation. Examples of functions that are assignable to key motions are illustrated below in FIGS. 16A–F.

The present invention can be of any size for implementation into any device that requires some form of user interface. Some examples of which are described below with reference to FIGS. 11–15. The keys may be implemented in shapes other than hexagons, such as shapes with more or fewer sides, or circles. With keys that are circular, directional motion sensing is performed within certain ranges of degrees around the circle.

Figure 4:
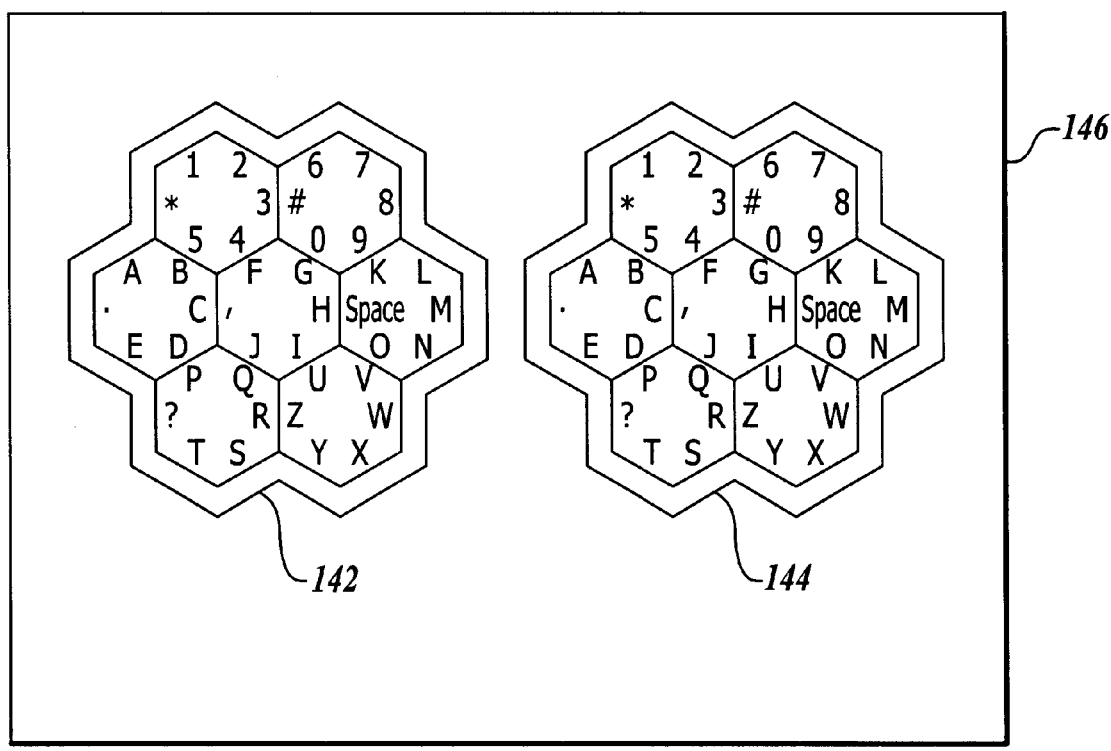
FIGS. 4 and 5 are top views of a two-handed embodiment of the present invention.
Figure 5:
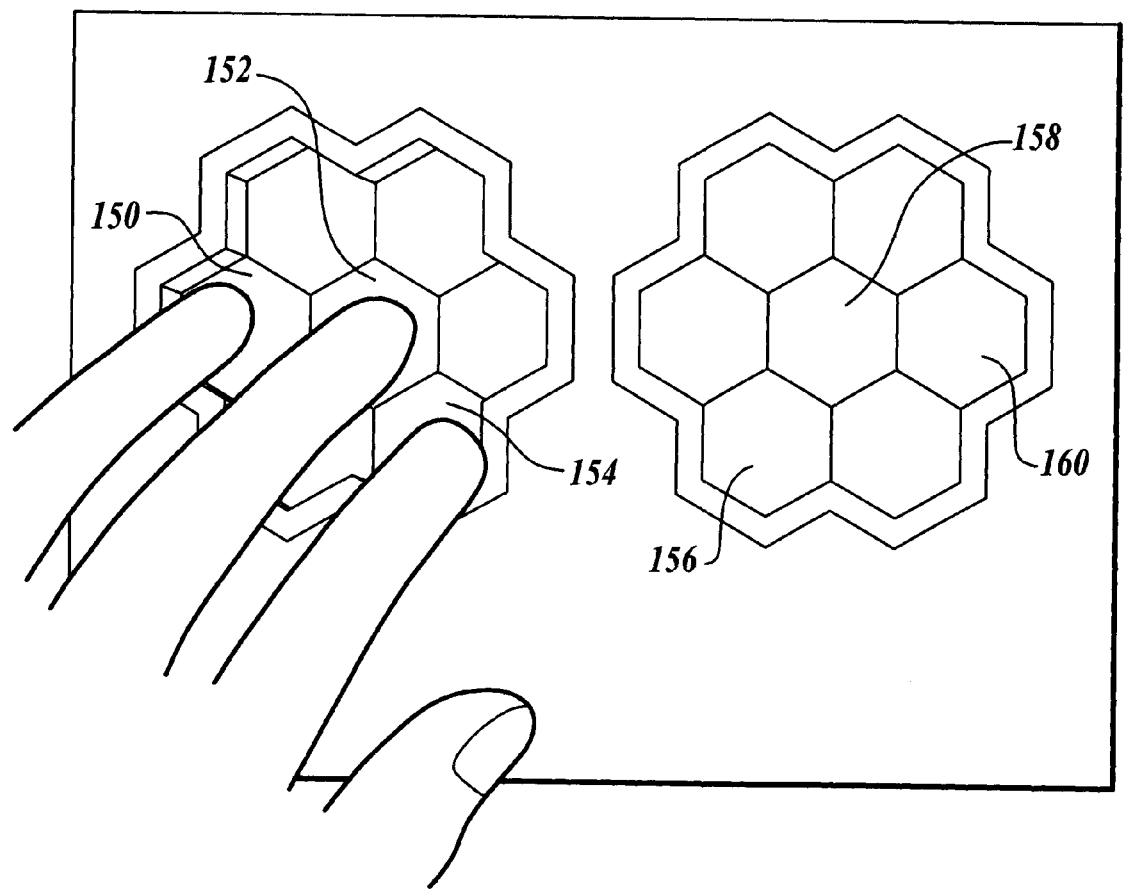

FIG. 4 illustrates a keyboard 146 that includes two identical sets of seven hexagon keys 142, 144. This keyboard layout is usable in a single-handed mode or a two-handed mode. In an alternate embodiment the sets of keys 142, 144 are not identical. As shown in FIG. 5, the users place their left hand on the left set of keys 142 and their right hand on the right set of keys 144. The users' ring finger on both their left and right hands are placed on the outermost middle keys 150, 160 of the respective sets of keys. The middle fingers are preferably placed on the middle key 152, 158 respectively of each set of keys 142, 144 and the forefingers are placed on the innermost bottom keys 154, 156 respectively. When users operate this two-handed keyboard 146 as described above, six fingers are in contact with keys associated with all the letters of the alphabet, and can select all of the letters without lifting any fingers. When the keyboard is operated as described above the user's hands rest in a natural position, thereby not producing finger fatigue associated with typing.

Figure 6:
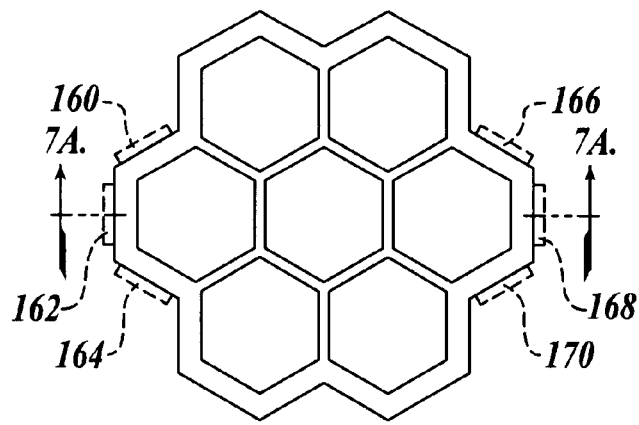
FIG. 6 is an x-ray top view of a single keypad formed in accordance with the present invention.
Figure 7A:
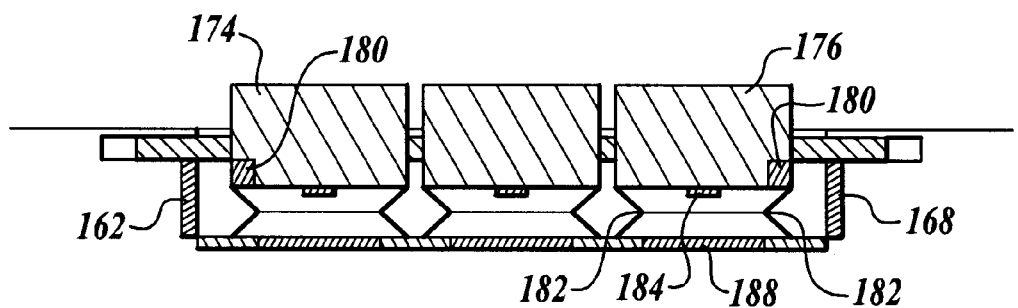
FIGS. 7A and B are cross-sectional views of the keypad shown in FIG. 6.
Figure 7B:
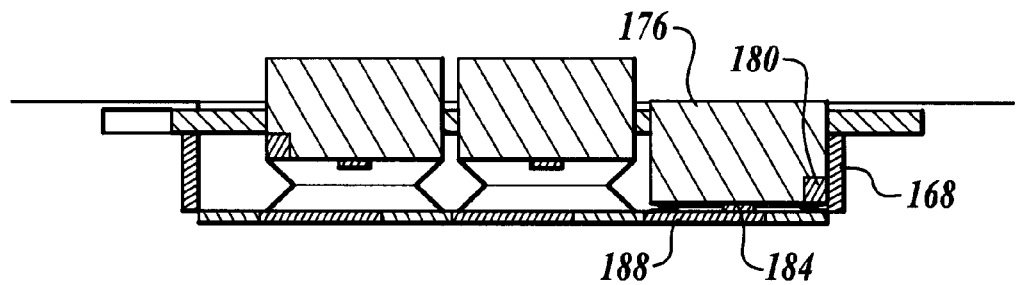

FIGS. 6, 7A and 7B illustrate the various sensors and mechanisms that enable a user to cause the set of keys to generate desired signals for either displaying characters or executing functions assigned to the keys. FIG. 6 is a plan view of a keypad 159. Since in this example each of the keys is hexagonal shaped and actions are assigned to each side of each key, the keypad requires mechanisms for sensing when the user moves the keys in one of the six directions. A direction is generally orthogonal to a side. In the embodiment shown in FIG. 6, the keys move as one unit within a cavity 171. Located within the cavity 171 are lateral sensors 161–170. The sensors 161–170 are located at all the possible directional sides that the keys can move. In this example, the edges of the cavity 171 closest to the outside three edges of both the left and right-most keys of the set of keys 159 include the lateral sensors 161–170. Alternatively, the sensors can be placed near any of the other keys provided that they sense all six directional movements of the plurality of keys 159. Moreover, only three sensors are required because each of the sensors 161, 162, 164 detects motion in the opposite direction as corresponding sensors 166, 168, 170. So long as three sensors are able to detect motion (or force) in both directions, three sensors are sufficient for the preferred hexagonal key embodiment.

FIGS. 7A and B are cross sectional views of the keypad shown in FIG. 6. The keys reside in the cavity 171 and each key is supported by a spring like support 182 that allows each key to move both vertically and horizontally within the cavity 171. Located at the base of each key is a sensor 184. Underneath each key on the cavity's base or within the cavity's base are a plurality of sensors 188 that sense when the key mounted sensor 184 contacts the sensor 188 or comes within a threshold distance, thereby generating a signal that indicates that the key has been depressed, as shown in FIG. 7B. The sensor 188 is wider than the key sensor 184 in order to compensate for when the key is slid in a lateral direction while being depressed. Located at the base and side of the keys closest to the lateral sensors 161–170 are sensors 180. The lateral sensors 161–170 sense and generate a signal in a similar manner as to that of sensor 188 when the key sensor 180 contacts a lateral sensor or comes within a threshold distance for activating a lateral signal. Also shown in FIG. 7B, the keys move laterally as one unit while each key is individually depressible. As an alternative, the keys may be depressible as a group. Because a greater force will be detected beneath the depressed key, in this embodiment the processor receives information from all downward force sensors and determines which key was depressed. Various types of sensing mechanisms can be used to detect key motion and depression. Conventional mouse buttons or optical systems can alternately be used to identify when motion occurs. Also, the spring like devices 182 may be replaced on pedestals for each key or a single pedestal for the entire set of keys for allowing motion both laterally and vertically.

Figure 8:
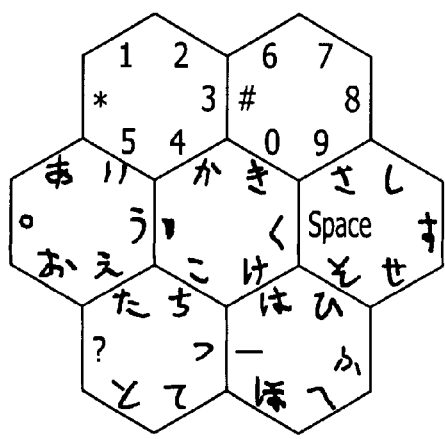
FIG. 8 illustrates a Japanese version of the present invention.
Figure 9A:
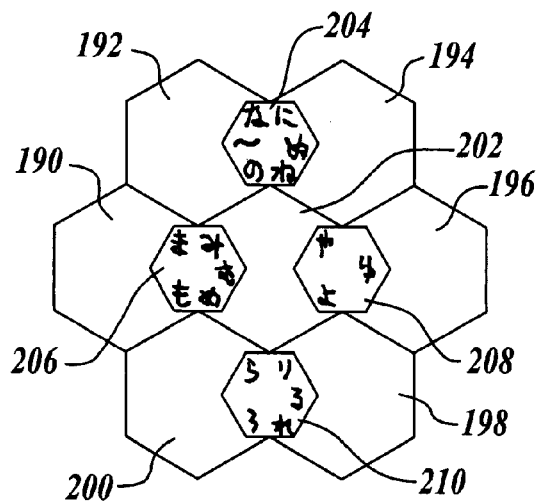
FIGS. 9A–C illustrate selectable Japanese alphabetic characters according to multiple key selections.
Figure 9B:
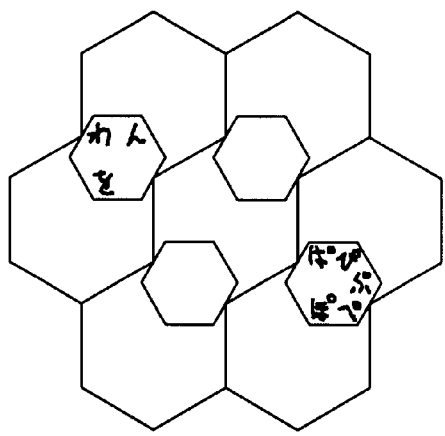
Figure 9C:
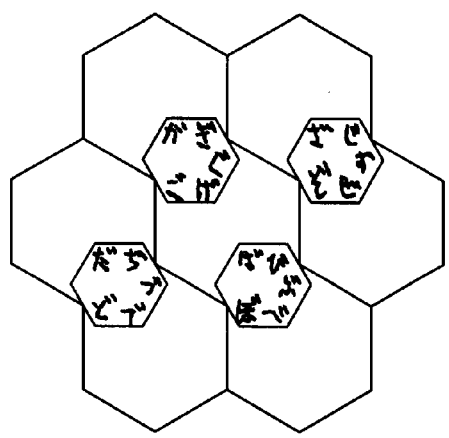

FIG. 8 illustrates a keypad, similar to the keys shown in FIG. 6, that includes Japanese alphabet characters instead of English alphabet characters. Other languages can also be implemented on the keyboard of the present invention. Since Japanese has many more alphabet characters, a greater number of characters are required on the input device in order to be effective. Therefore, there must be an ability to access more characters in order to adequately use this keyboard when modified to the Japanese language or other languages with a large amount of alphabet characters. In one embodiment, extra symbols are associated with key actions performed in the second mode of operation. FIGS. 9A–C illustrate a method for retrieving symbols not associated with the first or second mode of operation.

FIG. 9A illustrates additional character selections that are retrieved by the selection of two or more keys 190–202. If the keypad shown in FIG. 9A is a physical keypad, the keys 190–202 include assigned characters, such as shown in FIG. 8. Hexagon shapes 204–210 include additional characters and symbols. The hexagon shapes 204–210 are not shown on the keys, but are associated in memory with the keys 190–202 that they are shown here overlaying. In other words, when the underlying keys are substantially simultaneously depressed, either before or after lateral movement of the keys, one of the characters or symbols associated with the overlying shape is selected based on the direction of the lateral motion of the keys. For example, if keys 190–202 are moved in the 3:00 direction and the keys 192 and 194 are simultaneously depressed, the character selected for display is the character in the 3:00 position of the hexagon shape 204.

Other hexagon shapes 206–210 are associated with other sets of two key selections. FIGS. 9B and 9C illustrate other hexagon shapes that include additional characters or symbols; these other hexagon shapes are associated with activation of other pairs of keys. Also, characters and symbols are selectable from activation of more than two keys.

Figure 15:
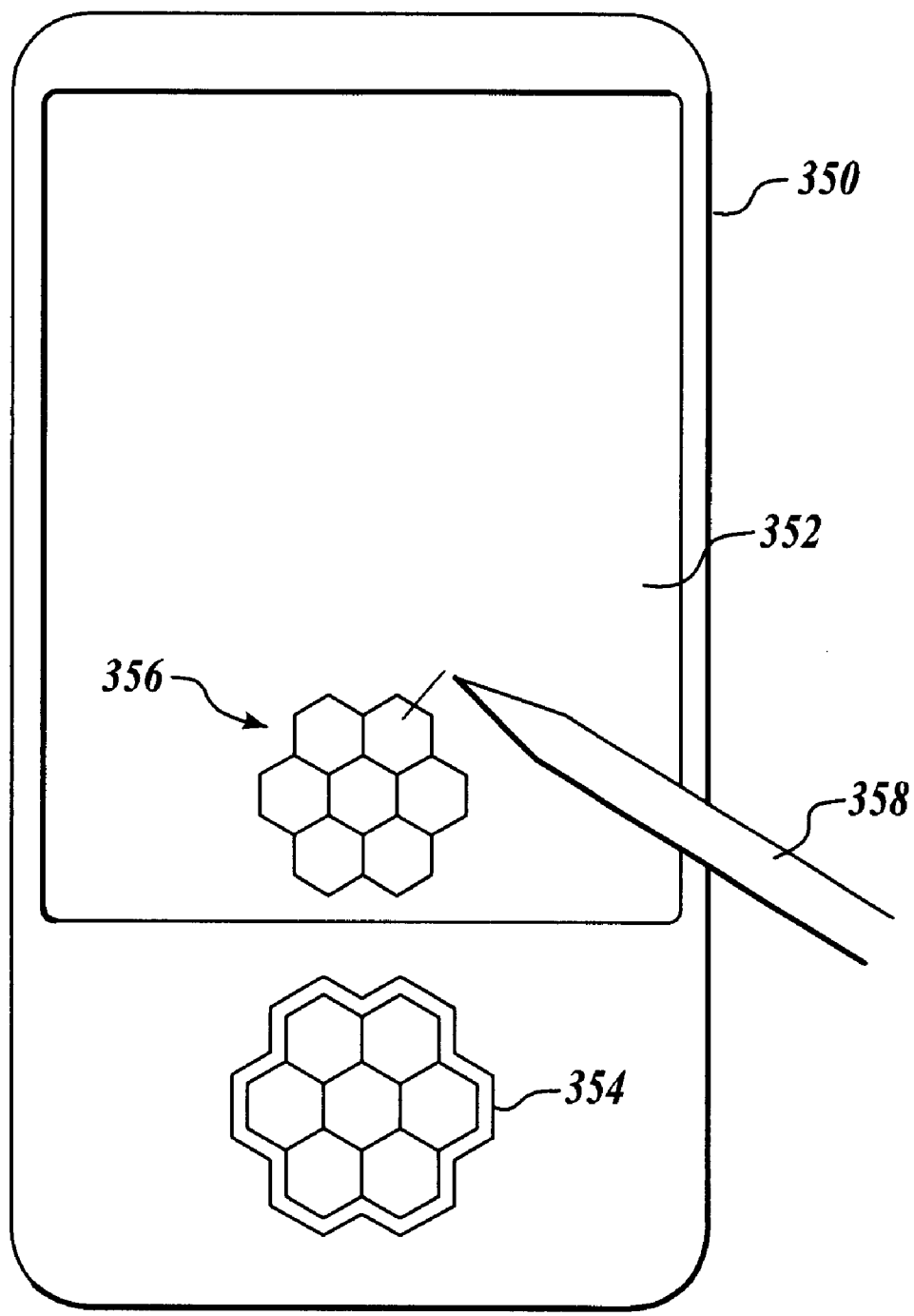

The present invention can also be implemented in a nonphysical keyboard mode (i.e. a virtual keyboard). For example, the keypad is implemented on a display screen, such as shown in FIG. 15 below. When implemented on a display screen or a touch display screen, the symbols (including numbers), characters or functions associated with key operation in the second mode or symbols, characters or functions associated with simultaneously selecting a plurality of keys, such as that shown in FIGS. 9A–C, are displayable on the display.

In the embodiment such as shown in FIG. 15 (or a similar embodiment in which the "keypad" is an overlay on a touch-sensitive device such as is commonly used for a computer pointer), the invention detects forces imparted on the keyboard. Because the keyboard in this embodiment does not move, each force is analyzed for a downward location component (to determine which key was selected) and a directional component (to determine the character on the key that is selected). In this fashion, the sliding strokes using a pointer, pen, stylus, or finger selects characters and functions as described above, though the keypad itself remains stationary.

Figure 10A:
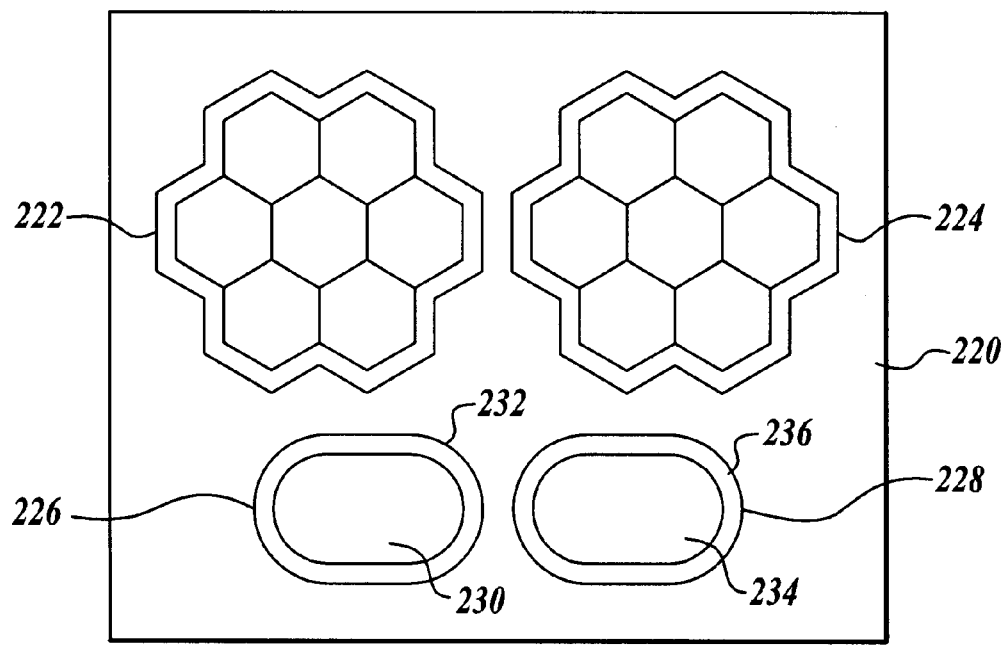
FIGS. 10A–B illustrate a top view of a two-handed keyboard with thumb controllers.
Figure 10B:
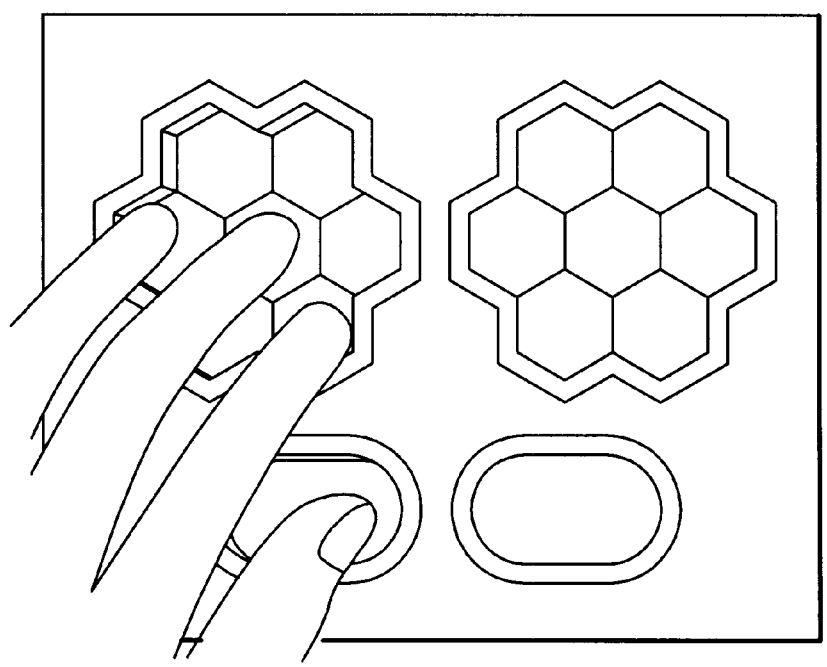

FIGS. 10A and 10B illustrate a two-handed keyboard 220 that includes thumb controllers 226, 228 that are used to aid in user operation of left and right keypads 222, 224 located on the keyboard 220. Each of the thumb controllers 226, 228 includes a thumb pad 230, 234 that resides in a cavity 232, 236. Each thumb pad 230, 234 moves in the X and Y directions within the respective cavity 232, 236. Each thumb pad is tied directly to the above associated set of keys. For example, if the user wants to move the plurality of left keys in the 3:00 direction, the user may either move the keypad 222 with their fingers in the 3:00 direction, move the thumb pad 230 below the left keypad in the 3:00 direction, or move both the thumb pad and the keypad 222 in the 3:00 direction. In an alternate embodiment, the thumb pad is the device that indicates directional motion for the keypad and the keypad is a stationary set of keys that only allow individual selection of the keys. In still another embodiment, the keyboard includes one thumb controller that is used for indicating lateral X-Y motion for one or both of the keypads 222, 224. The thumb pads can also be configured to move in the Z direction for performing other preassigned tasks.

Figure 11:
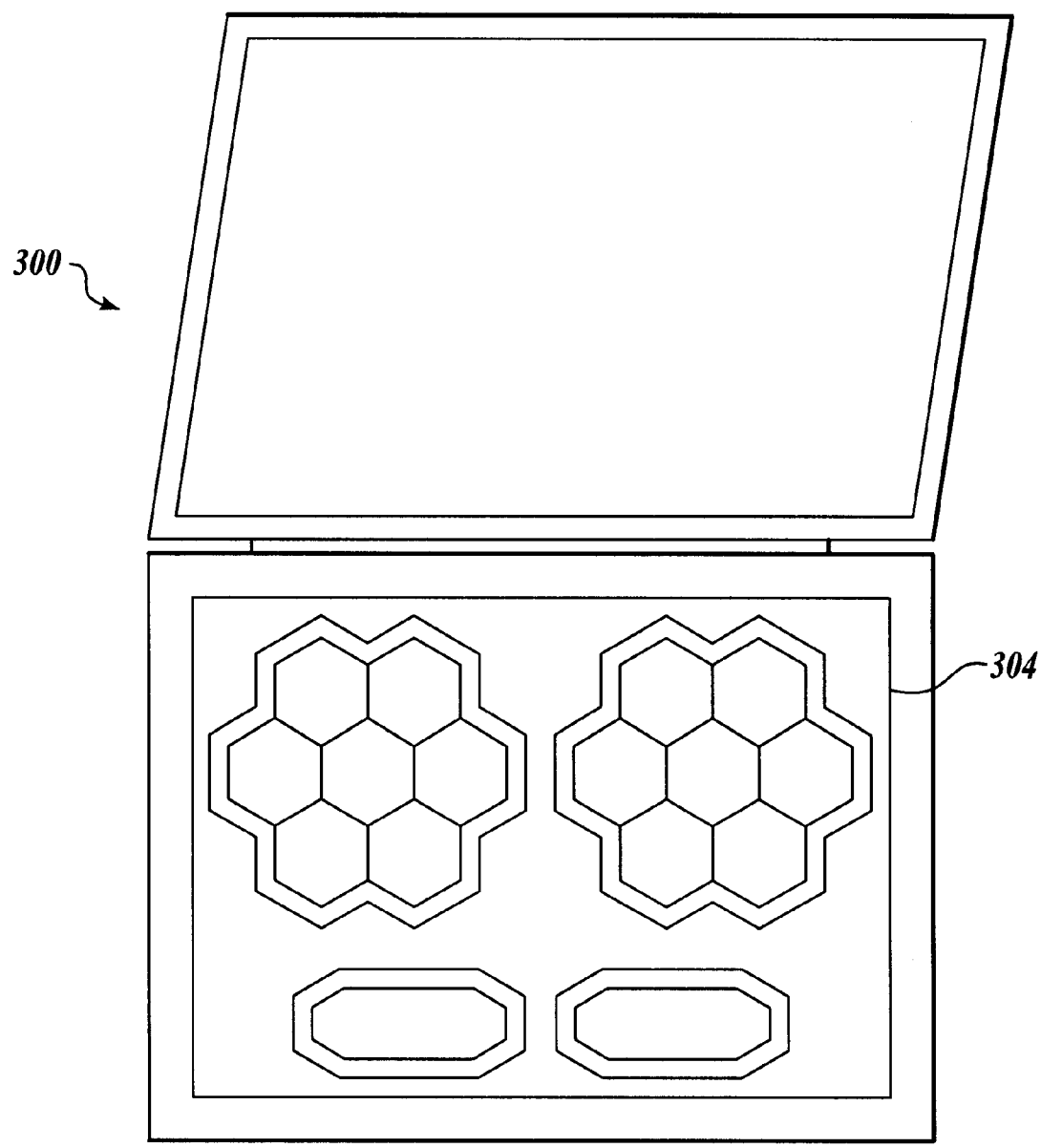

FIG. 11 illustrates the keypad 220 implemented on a laptop computer device 300. Though shown on a laptop, it operates as described in the other embodiments or handheld Computer-OEM.

FIGS. 12A and 12B illustrate a cellular phone device 310 that includes a single keypad 312 similar to the keypad shown in FIG. 3. The keypad 312 is preferably located below a display area 314. The assignment of characters, symbols and functions to the keypad 312 is based on what characters, symbols, and functions are needed for effective user interaction with the cellular phone device 310.

Figure 13A:
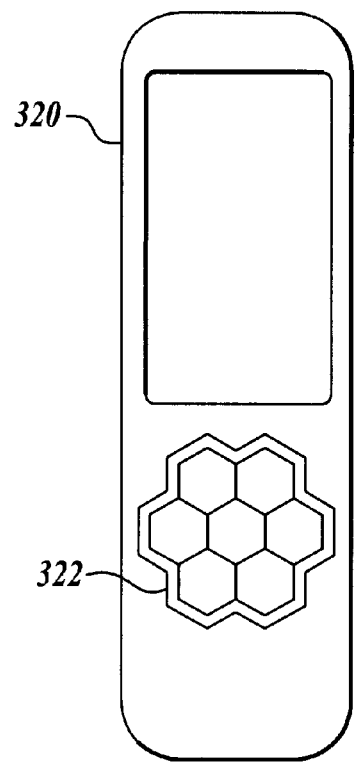
Figure 13B:
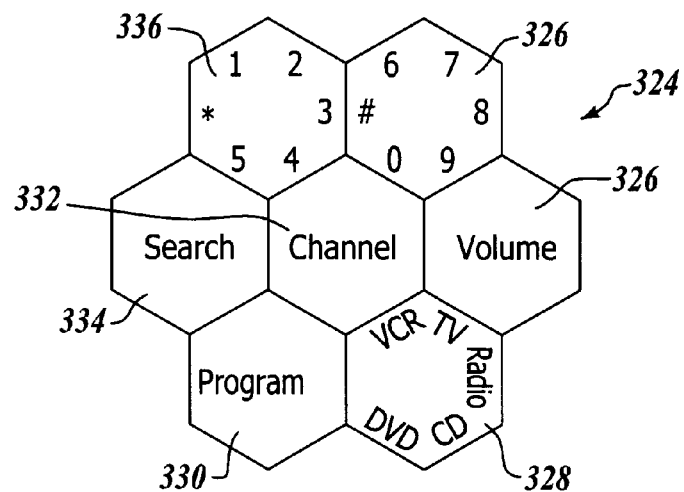

FIG. 13A illustrates a remote control device 320 that includes a keypad 322, a close-up of which is shown in FIG. 13B. The keypad 322 is located below a display area 323. As shown in FIG. 13B, the keys are assigned numbers on keys 326, 336 and device control functions on keys 327–334 for the first mode of operation. If the user desires to increase the volume, the user moves the keypad in the one of six directions on the Volume key 327 that is assigned to generating a volume increase signal and depresses the Volume key 327. In this embodiment and other embodiments, the first mode of operation has a possible 7 keys×6 sides per key=42 places to assign a feature/command. Therefore, if the device in which the present invention is implemented does not require the generation of more than 42 command signals (these include number/character/symbol selection or operational function), then there is no a need to have a first and second mode of operation as described above. Thus, the step performed at decision block 54 of FIG. 2A is not performed. It does not matter what the first motion in a series of motions is. So, in the example above, the volume can be increased by first depressing the Volume key 327, then moving the keypad in the one of six directions on the Volume key 327 that is assigned to generating a volume increase signal or by moving the keypad laterally and then depressing the volume key.

Figure 14:
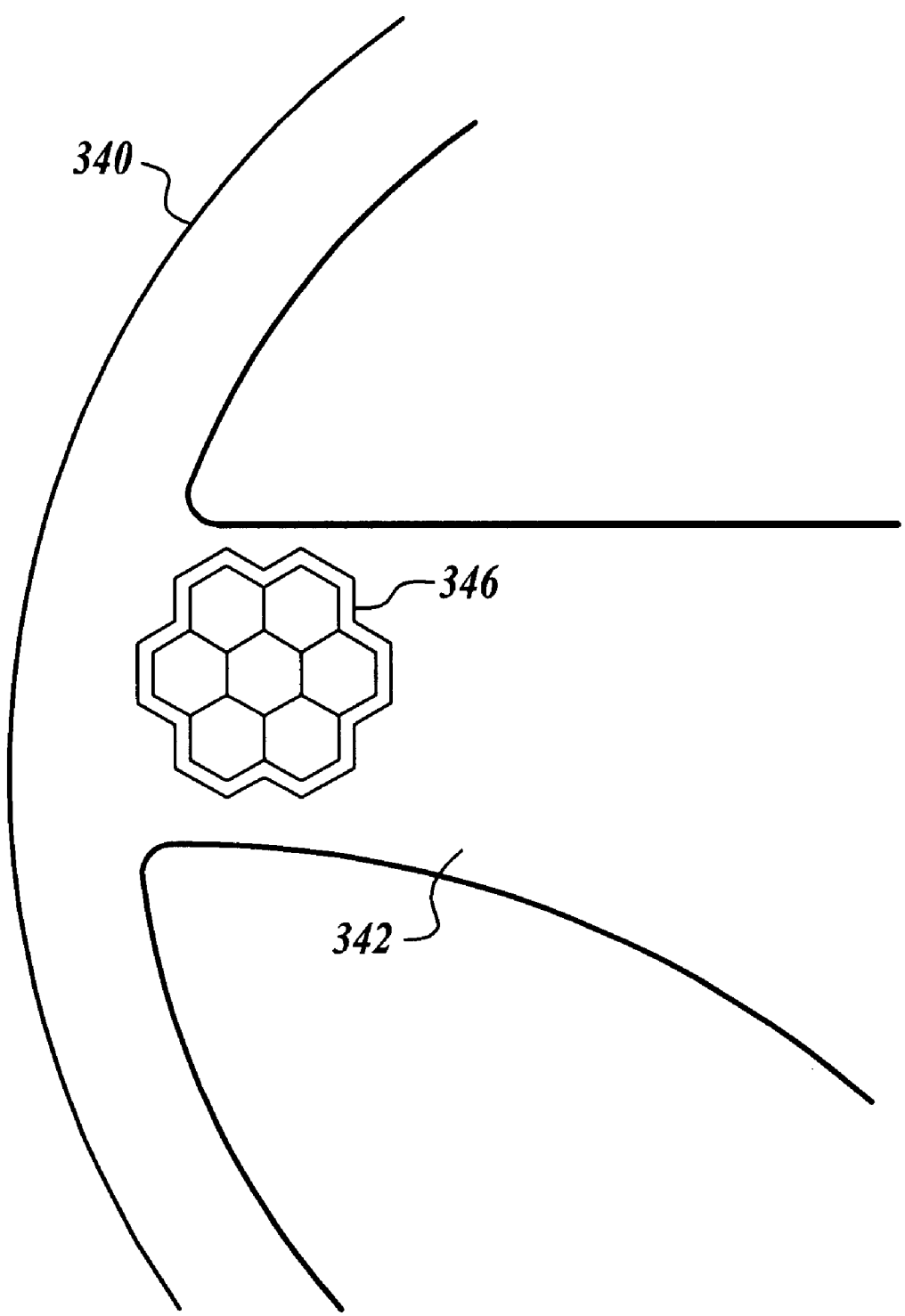

FIG. 14 illustrates a vehicle steering wheel 340 that includes a single keypad 346 similar to the keypad shown in FIG. 3. In this embodiment, the keypad 346 is mounted on a spoke 342 of the steering wheel 340 the outer portion of the spoke 342. The keypad 346 allows a driver to control a greater amount of vehicle systems and accessories without having to remove their hands from the steering wheel 340. The vehicle can also be implemented with a display device, not shown, that works in conjunction with user operation of the keypad 346. In one embodiment, the display device is a heads-up display on the windshield of the vehicle.

FIG. 15 illustrates a personal data assistant 350 that includes a single keypad 354 similar to the keypad shown in FIG. 3. The keypad 354 is mounted below a touch-screen display 352. In an alternate embodiment, the personal data assistant 350 presents a displayed version 356 of the keypad 354 on the display 352. The displayed keypad version 356 is preferably used in conjunction with a stylus 358 or just the user's finger. In order for a user to select an item (character, symbol, function, etc.) assigned to a side of a key of the displayed keypad version 356, the stylus 358 is placed on the desired key and slid in the direction of desired item.

Figure 16A:
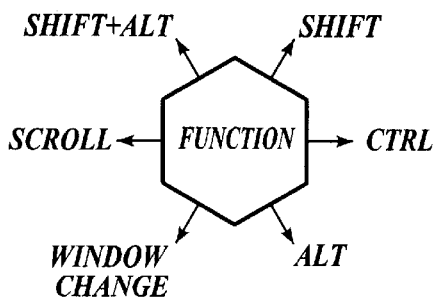
FIGS. 16A–F illustrate various functions assigned to different key motions.
Figure 16B:
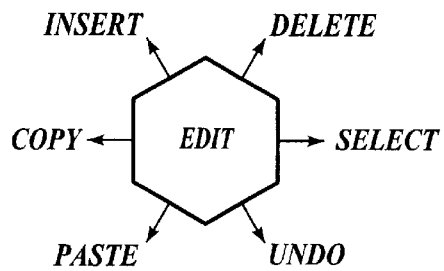
Figure 16C:
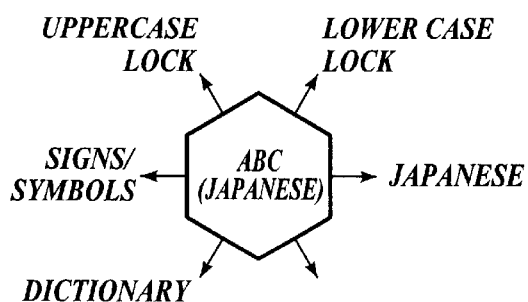
Figure 16D:
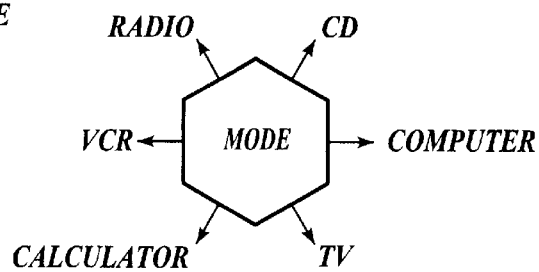
Figure 16E:
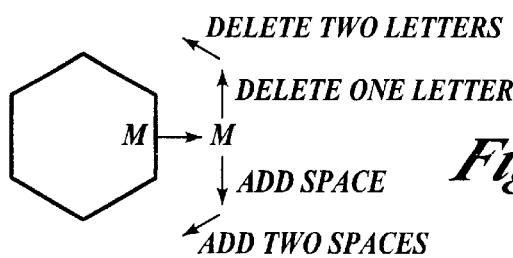
Figure 16F:
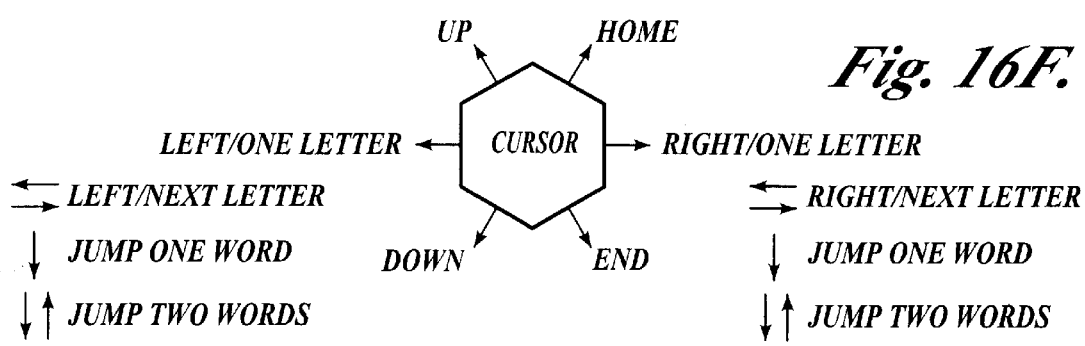

FIGS. 16A–F illustrate various embodiments of actions/functions assigned to key motions. The arrows indicate the motion that the user applies to the keypad and the words next to the arrows describe the associated action or function. The examples illustrated are only a few of numerous possible assignments of action and functions to key motions. The present invention can also be switched to operate in either the first or second modes or with selectable inputs not shown on the keys. For example, as shown in FIG. 16C, the entire keypad can be switched to a Japanese mode of entry, whereby the key motions are now assigned to the entry of Japanese symbols.

In an alternate embodiment, the first mode of operation is activated regardless of whether the X-Y or Z motion is first in a series of motions provided that if a Z motion is first, the following X-Y motion comes within a threshold period of time from the Z motion. Otherwise, if the following X-Y motion does not come within a threshold period of time from the Z motion, the second mode of operation is activated.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A user interface device comprising:
    a plurality of geometrically-shaped keys slidably retained within a housing, each key being associated with a plurality of characters or functions, the plurality of keys further joined together to slide substantially in unison;
    a force detector configured to detect force applied to one or more of the plurality of keys;
    a lateral movement sensor configured to sense direction of motion of the plurality of keys; and
    a selection component for selecting at least one of a character or function based on the detected force and the sensed direction of motion.

2. The user interface device of claim 1, wherein the lateral movement sensor comprises a direction sensor and a distance sensor, wherein the direction of motion is sensed based on a lateral movement sensed by the lateral movement sensor and a distance value sensed by the distance sensor.

3. The user interface device of claim 1, wherein the lateral movement sensor comprises a plurality of key mounted activators and housing-mounted sensors, wherein the housing-mounted sensors sense when a key mounted activator is within a threshold distance and wherein the direction of motion is sensed based on the housing-mounted sensor that sensed an activator within the threshold distance.

4. The user interface device of claim 1, further comprising an output device for presenting the selected character or function based on the detected force and the sensed direction of motion.

5. The user interface device of claim 1, wherein the character or function selected by the selection component is associated with the key where the force was detected.

6. The user interface device of claim 5, wherein each character and function associated with each key is further associated with a direction of motion of the plurality of keys.

7. The user interface device of claim 6, wherein the character or function selected by the selection component is the character or function associated with a direction on the key closest to the sensed direction of motion.

8. The user interface device of claim 1, wherein the selection component selects from a first set of characters or functions regardless of whether a sensed direction of motion or a detected force is first in a series of sensor detections provided that if a detected force is first, the following sensed direction of motion above a threshold amount comes within a threshold period of time from the detected force, and if a sensed direction of motion that follows a detected force in a series of sensor detections does not come within a threshold period of time from the detected force, the selection component selects from a second set of characters or functions.

9. The user interface device of claim 1, further comprising:
    a thumb control pad moveable within the housing.

10. The user interface device of claim 9, wherein the direction sensor is further configured to detect direction of motion of the thumb control pad.

11. The user interface device of claim 10, wherein thumb control pad movement moves the plurality of keys in the same direction of motion that the thumb control pad is being moved.

12. The user interface device of claim 1, wherein the plurality of keys are circular.

13. The user interface device of claim 1, wherein the keys are hexagon shaped.

14. The user interface device of claim 1, further comprising:
    a second set of a plurality of keys slidably retained within the housing, each key being associated with a plurality of characters or functions, the plurality of keys further joined together to slide substantially in unison,
    wherein the force detector is configured to detect force applied to one or more of the second set of the plurality of keys, the direction sensor is configured to detect direction of motion of the second set of the plurality of keys, and the selection component selects at least one of the plurality of characters or functions associated with the second set of the plurality of keys based on the detected force and sensed direction of motion applied to the second set of the plurality of keys.

15. The user interface device of claim 14, further comprising:
    a pair of thumb control pads moveable within the housing, each thumb control pad being associated with one of the sets of a plurality of keys.

16. The user interface device of claim 15, wherein the direction sensor is further configured to detect direction of motion of the thumb control pads.

17. The user interface device of claim 16, wherein movement of each thumb control pad moves the corresponding set of plurality of keys in the same direction of motion that the thumb control pad is being moved.

18. The user interface device of claim 14, wherein the plurality of keys of the first and second set of plurality of keys are circular.

19. The user interface device of claim 14, wherein the plurality of keys of the first and second set of plurality of keys are hexagon shaped.

20. The user interface device of claim 14, wherein the plurality of characters comprise letters of the English alphabet and the plurality of letters associated with the first and second set of a plurality of keys are arranged in at least one of a substantially QWERTY, alphabetic, or Dvorak relationship.

21. The user interface device of claim 1, wherein the force detector comprises a key identifying component for identifying the key where the greatest force was detected.

22. A user interface method using a plurality of geometrically-shaped keys each key being associated with a plurality of characters or functions, comprising:
    detecting force applied to one or more of the plurality of keys;
    detecting direction of motion of one or more of the plurality of keys; and
    selecting at least one of a character or function based on the detected force and sensed direction of motion.

23. The method of claim 22, wherein detecting direction of motion comprises sensing lateral movement and a distance value and wherein the detected direction of motion is based on the sensed lateral movement and distance value.

24. The method of claim 22, further comprising:
presenting the selected at least one character or function based on the detected force and sensed direction of motion.

25. The method of claim 22, wherein the character or function selected by the selection component is associated with the key where the force was detected.

26. The method of claim 25, wherein each character and function associated with each key is further associated with a direction of motion of the plurality of keys.

27. The method of claim 26, wherein the character or function selected by the selection component is associated with a direction on the key closest to the sensed direction of motion.

28. The method of claim 22, wherein selecting comprises:
determining whether a sensed direction of motion in a series of sensor detections is detected before a detected force;
selecting from a first set of a plurality of characters or functions, if a sensed direction of motion in a series of sensor detections is sensed before a detected force; and
selecting from a second set of a plurality of characters or functions, if a detected force in a series of sensor detections is sensed before a sensed direction of motion.

29. The method of claim 22, wherein selecting comprises:
selecting from a first set of a plurality of characters or functions regardless of whether a sensed direction of motion or a detected force is first in a series of sensor detections, provided that if a detected force is first, the following sensed direction of motion comes within a threshold period of time from the detected force, and
if a sensed direction of motion that follows a detected force in a series of sensor detections does not come within a threshold period of time from the detected force, selecting from a second set of a plurality of characters or functions.

30. The method of claim 22, wherein detecting force comprises identifying the key where the greatest force was detected.

31. A user interface device comprising:
a plurality of geometrically-shaped keys slidably retained within a housing, each key being associated with a plurality of characters or functions, the plurality of keys further joined together to slide substantially in unison;
a force detector means for detecting force applied to one or more of the plurality of keys;
a lateral movement sensor means for sensing direction of motion of the plurality of keys; and
a selection component means for selecting at least one of a character or function based on the detected force and the sensed direction of motion.

32. The user interface device of claim 31, wherein the lateral movement sensor comprises:
a direction sensor means for sensing lateral movement; and
a distance sensor means for sensing a distance value,
wherein the direction of motion is sensed based on the sensed lateral movement and the sensed distance value.

33. The user interface device of claim 31, wherein the lateral movement sensor comprises
a plurality of key mounted activator means; and
a plurality of housing-mounted sensor means for sensing when a key mounted activator is within a threshold distance,
wherein the direction of motion is sensed based on the housing-mounted sensor means that sensed an activator within the threshold distance.

34. The user interface device of claim 31, further comprising an output means for presenting the selected character or function based on the detected force and the sensed direction of motion.

35. The user interface device of claim 31, wherein the character or function selected by the selection component means is associated with the key where the force was detected.

36. The user interface device of claim 35, wherein each character and function associated with each key is further associated with a direction of motion of the plurality of keys.

37. The user interface device of claim 36, wherein the character or function selected by the selection component means is the character or function associated with a direction on the key closest to the sensed direction of motion.

38. The user interface device of claim 37, wherein the selection component means selects from a first set of characters or functions regardless of whether a sensed direction of motion or a detected force is first in a series of sensor detections provided that if a detected force is first, the following sensed direction of motion above a threshold amount comes within a threshold period of time from the detected force, and if a sensed direction of motion that follows a detected force in a series of sensor detections does not come within a threshold period of time from the detected force, the selection component selects from a second set of characters or functions.

39. The user interface device of claim 31, further comprising:
a thumb control means moveable within the housing.

40. The user interface device of claim 39, wherein the direction sensor is further configured to detect direction of motion of the thumb control means.

41. The user interface device of claim 40, wherein thumb control means movement moves the plurality of keys in the same direction of motion that the thumb control pad is being moved.

42. The user interface device of claim 31, wherein the plurality of keys are circular.

43. The user interface device of claim 31, wherein the keys are hexagon shaped.

44. The user interface device of claim 31, further comprising:
a second set of a plurality of keys slidably retained within the housing, each key being associated with a plurality of characters or functions, the plurality of keys further joined together to slide substantially in unison,
wherein the force detector means is configured to detect force applied to one or more of the second set of the plurality of keys, the direction sensor is configured to detect direction of motion of the second set of the plurality of keys, and the selection component selects at least one of the plurality of characters or functions associated with the second set of the plurality of keys based on the detected force and sensed direction of motion applied to the second set of the plurality of keys.

45. The user interface device of claim 44, further comprising:
a pair of thumb control pads moveable within the housing, each thumb control pad being associated with one of the sets of a plurality of keys.

46. The user interface device of claim 45, wherein the direction sensor is further configured to detect direction of motion of the thumb control pads.

47. The user interface device of claim 46, wherein movement of each thumb control pad moves the corresponding set of plurality of keys in the same direction of motion that the thumb control pad is being moved.

48. The user interface device of claim 44, wherein the plurality of keys of the first and second set of plurality of keys are circular.

49. The user interface device of claim 44, wherein the plurality of keys of the first and second set of plurality of keys are hexagon shaped.

50. The user interface device of claim 44, wherein the plurality of characters comprise letters of the English alphabet and the plurality of letters associated with the first and second set of a plurality of keys are arranged in at least one of a substantially QWERTY, alphabetic, or Dvorak relationship.

51. The user interface device of claim 31, wherein the force detector means comprises a key identifying component for identifying the key where the greatest force was detected.

52. A user interface device comprising:
   a plurality of buttons displayed on a touch sensitive screen, each button being associated with a plurality of characters or functions;
   a force detector for detecting force applied to one or more of the plurality of buttons;
   a lateral movement sensor for sensing direction of motion of a stroke performed on the touch sensitive screen; and
   a selection component for selecting at least one of a character or function based on the detected force and the sensed direction of motion.

53. The user interface device of claim 52, wherein the lateral movement sensor comprises a direction sensor and a distance sensor, wherein the direction of motion is sensed based on a lateral movement sensed by the lateral movement sensor and a distance value sensed by the distance sensor.

54. The user interface device of claim 52, further comprising an output device for presenting the selected character or function based on the detected force and the sensed direction of motion.

55. The user interface device of claim 52, wherein the character or function selected by the selection component is associated with the button where the force was detected.

56. The user interface device of claim 55, wherein each character and function associated with each button is further associated with a direction of motion.

57. The user interface device of claim 56, wherein the character or function selected by the selection component is the character or function associated with a direction on the button closest to the sensed direction of motion.

58. The user interface device of claim 52, wherein the selection component selects from a first set of characters or functions regardless of whether a sensed direction of motion or a detected force is first in a series of sensor detections provided that if a detected force is first, the following sensed direction of motion above a threshold amount comes within a threshold period of time from the detected force, and if a sensed direction of motion that follows a detected force in a series of sensor detections does not come within a threshold period of time from the detected force, the selection component selects from a second set of characters or functions.

59. The user interface device of claim 52, further comprising:
   a thumb control pad moveable within the housing.

60. The user interface device of claim 59, wherein the direction sensor is further configured to detect direction of motion of the thumb control pad.

61. The user interface device of claim 60, wherein thumb control pad movement moves the plurality of buttons in the same direction of motion that the thumb control pad is being moved.

62. The user interface device of claim 52, wherein the buttons are circular.

63. The user interface device of claim 52, wherein the buttons are hexagon shaped.

64. A user interface device comprising:
   a plurality of geometrically-shaped keys slidably retained within a housing, each key being associated with a plurality of characters or functions, the plurality of keys being separately slidable;
   a force detector configured to detect force applied to one or more of the plurality of keys;
   a lateral movement sensor configured to sense direction of motion of the plurality of keys; and
   a selection component for selecting at least one of a character or function based on the detected force and the sensed direction of motion.

* * * * *